UNITED STATES PATENT OFFICE.

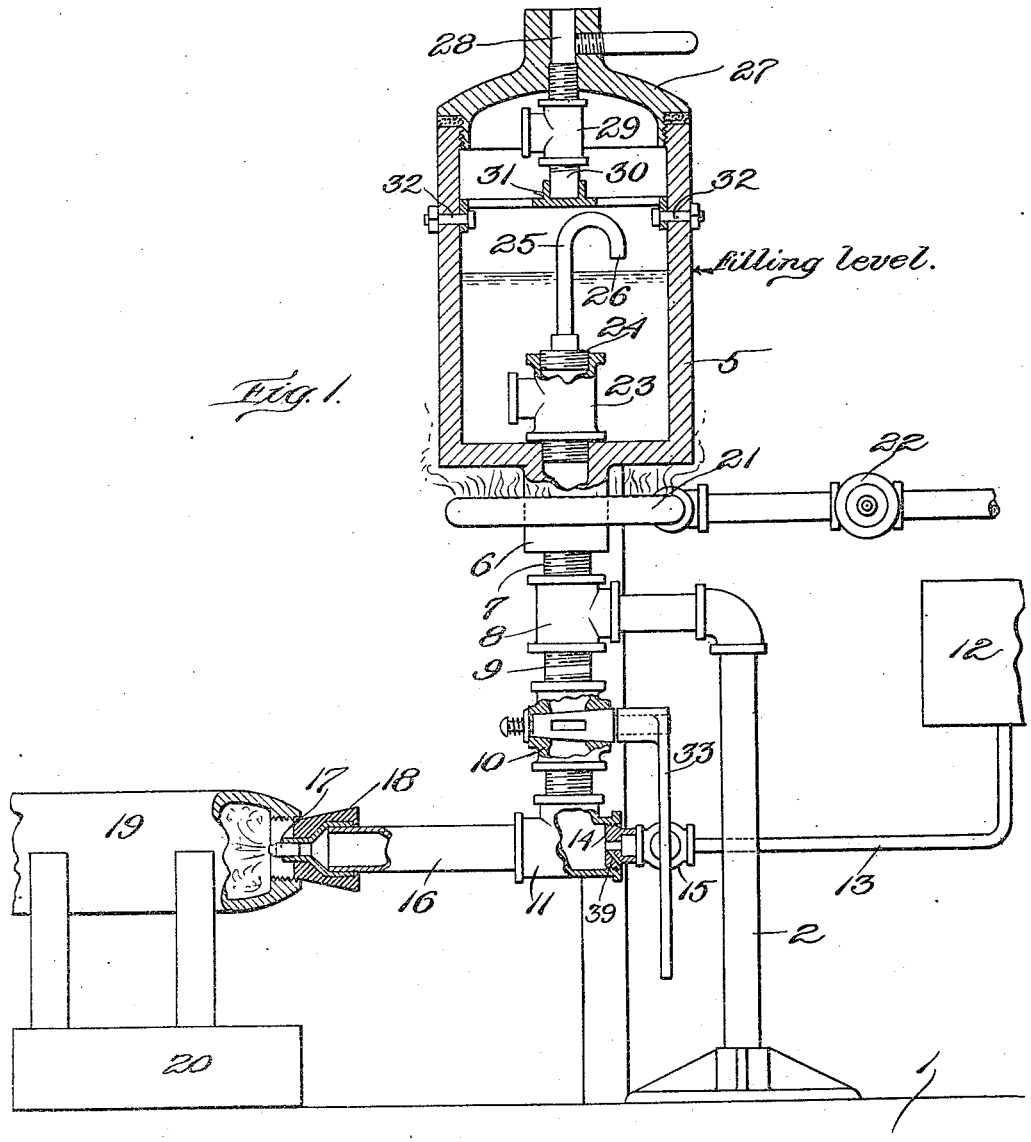

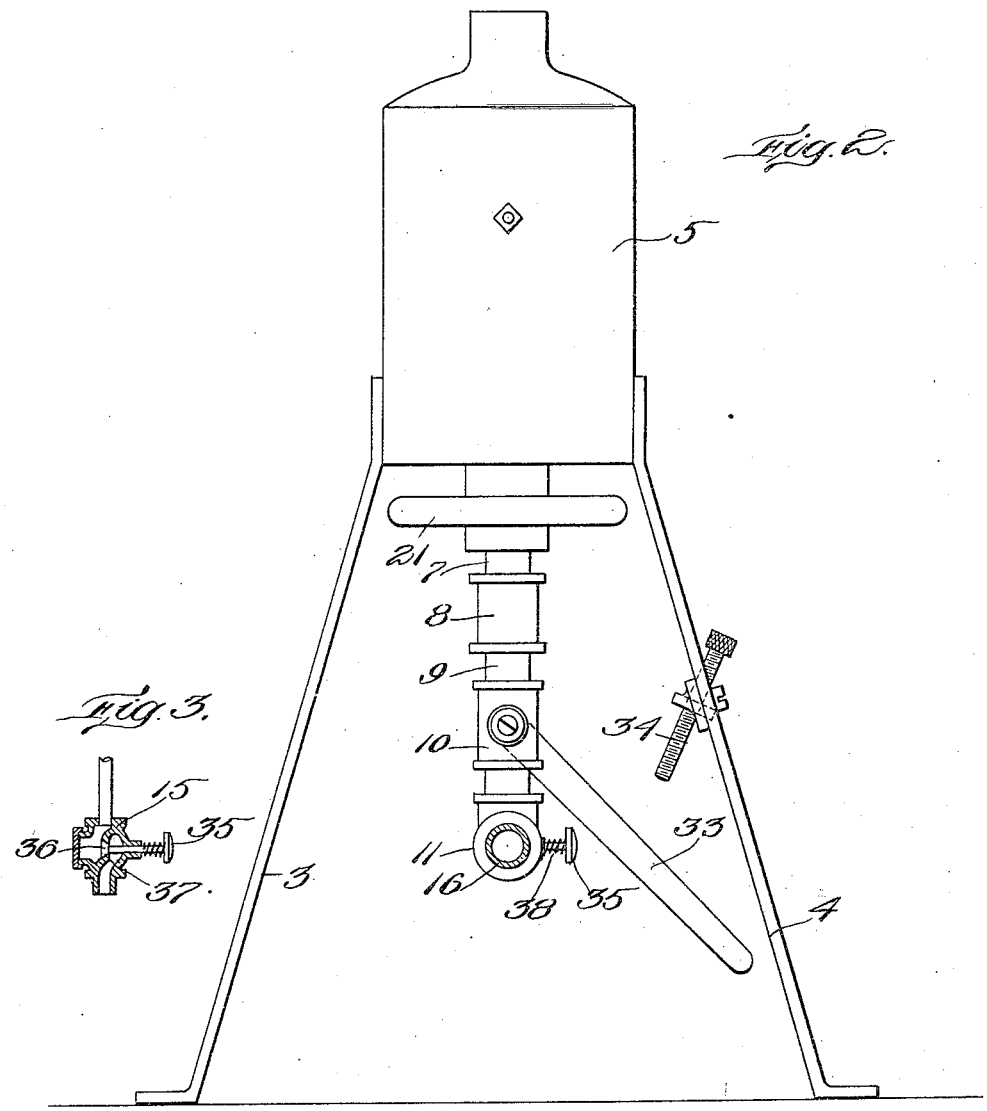

MICHAEL J. ROCHE, OF CAMBRIDGE, MASSACHUSETTS.

SPRAYING APPARATUS.

1,267,118.  Specification of Letters Patent.  Patented May 21, 1918.

Application filed August 19, 1916. Serial No. 115,885.

*To all whom it may concern:*

Be it known that I, MICHAEL J. ROCHE, citizen of the United States, and resident of Cambridge, in the county of Middlesex and State of Massachusetts, have invented certain new and useful Improvements in Spraying Apparatus, of which the following is a specification.

This invention relates to spraying apparatus and with regard to certain more specific features thereof to devices for spraying grease, oil or other lubricants.

The invention has for one of its objects to provide a simple and inexpensive device of the character referred to and one which can be operated by relatively unskilled workmen.

In devices of this general character it is the common practice to heat the lubricant to facilitate its flow and the application thereof to the work. General objection has been found to previous types because of the cooling of the grease or lubricant in the valves or pipes thereby obstructing the free passage of the lubricating material upon subsequent operation. The present invention is designed to overcome this objection.

It is another object of the invention to provide means for insuring the safety of the operator against burning due to explosions or spouting of the hot lubricant. Other objects will be in part obvious and in part pointed out hereinafter.

The invention accordingly consists in various features of construction, combinations of elements and arrangements of parts, which will be exemplified by the construction hereinafter set forth and the scope of the application of which will be indicated in the following claims.

In the accompanying drawings wherein is shown one of various possible embodiments of the invention:—

Figure 1 is a front view of an improved spraying device.

Fig. 2 is a right side elevational view of Fig. 1.

Fig. 3 is a view of the valve in the air inlet pipe.

Referring now more particularly to the drawings wherein similar reference characters refer to similar parts throughout the several views, there is indicated at 1 a base or table having mounted thereon the upright 2 and side braces 3 and 4, the braces extending upwardly supporting a pot or reservoir 5. The latter is formed with a depending hub or boss 6 which receives a pipe nipple 7 which in turn has threaded thereon a T coupling 8 joining with the upright 2. A pipe nipple 9 connects a gate valve 10 with the T member 8, and suitable piping is provided to complete a conduit from the bottom of the reservoir or pot 5 to a T member 11 which latter serves as a chamber for the reception of oil and air as will hereinafter become apparent. A source of supply of air under pressure is indicated at 12, suitably piped as indicated at 13 to a nipple 14 which enters one end of the T shaped chamber 11. A valve 15 is provided in the pipe 13, the interior construction of this valve being clearly shown in Fig. 3 of the drawings. Pipe 13 enters the chamber 11 at right angles to the conduit above referred to and a discharge member 16 extends from the chamber 11 and from a point opposite the entrance of the air supply pipe. This discharge member is equipped with a suitable spray nozzle 17 and a frusto-conical bushing adapted to receive the open end of the work to be sprayed, which in this instance is shown as a high explosive shell 19. On the table 1 is provided a work support 20. Directly under the pot 5 there is provided a circular gas burner 21 which connects through a valve 22 to a source of gas supply. Arranged inside the pot and threaded inside the bottom wall thereof is a T member 23 the stem of which opens into the pot at a point some distance away from the top surface of the bottom wall. Threaded into the upper part of this T is a nipple 24 which is turn has threaded therein a bent or curved pipe 25 the discharge orifice 26 of which is directed downwardly toward the upper surface of the contents of the pot. In operation it is designed that the pot shall be filled to a level as indicated in the drawings, (Fig. 1) and no higher, so that the discharge orifice 26 does not project into the contents of the pot. The pot 5 has threaded thereon a cap or cover portion 27 which is apertured or perforated as at 28. A T member 29 is threaded into the aperture 28 and opens into the pot at right angles to said aperture. The T member is provided with a nipple 30 which enters a spider 31, the latter serving to hold the T member and the associated construction securely in place by means of bolts 32 and also serving to close the end of the pipe nipple 30.

An operating handle 33 is provided for moving the ports of the gate valve 10 into and out of registration in a manner which is well known. An adjustable stop 34 is provided for varying the limit of movement of the operating handle 33 into the port registering position. By this construction the size of the passage through the gate valve may be varied. The movement of the handle 33 away from the stop 34 operates the air valve 15 by engaging with a button 35 and moving the valve head 36 away from the seat 37. A spring 38 is provided for returning the valve stem to normally closed position.

The operation of the device is as follows:—

The grease or lubricant is poured into the pot 5 up to the point marked "Filling level." The cap or cover 27 is then adjusted in place. In a short time the heat from the gas burner 21 brings the temperature of the pot and its contents to a desired point where the lubricant is adapted to flow freely. The work is then mounted on the support 20 and moved longitudinally to bring an end opening against the rubber bushing 18 whereby the cavity in the work is suitably sealed. The operator then moves the handle 33 against the stop 34 registering the ports in the gate valve for a short interval which permits the heated lubricant to flow from the reservoir down through the vertical conduit into the chamber 11. The operator then moves the handle 33 quickly against the button 35 to open the air valve 15. Air under pressure from the supply tank 12 is thereby introduced to the chamber 11 and because of the fact that the gate valve is then in closed position, the air and lubricant pass out through the discharge member 16. The heated lubricant is discharged through the spray nozzle 17 in atomized condition to the cavity of the work. A very small vent 39 is provided as a precaution against a leaky air valve.

Now assuming that the apparatus has been left standing for a period of time, perhaps in a place of low temperature, and the liquor in the vertical conduit has hardened and obstructed the free passage, the operator may by closing the discharge member or spray nozzle either with his hand or a suitable cap provided for that purpose, and opening the gate and air valves, direct the compressed air upwardly through the vertical conduit, through the pipe 25, discharge opening 26, where its force would be distributed or neutralized by the contents of the pot. This will immediately open up a passage for the lubricant which in its heated condition will flow through the stem of the T member 23 and down through the vertical conduit and assist in clearing the passage. The T member 29 provides an exit for the air discharged from the bent pipe 25 and this T member is purposely irregular to avoid the possibility of discharging the hot liquor in volume through the aperture 28. Upon clearing the passages in the manner just described there is no possibility of the operator being scalded by a discharge of hot liquor. The exhaust is at its worst merely a vapor or extremely atomized fluid.

The construction comprising the handle 33, the stop 34 and the button 35 provides in a measure a timing device so that when the handle is operated at an average speed the lubricant in the chamber 11 is not permitted to congeal. For an operator of comparatively slow action the stop 34 may be adjusted to lessen the registration of the ports of the gate valve so that the charge of lubricant taken to the chamber may be substantially equal to that drawn by a more active operator who uses the full registration of the ports. It will be noted that the T valve 23 has its stem directly at right angles to the force exerted by gravity and that this stem which provides the opening through which the liquor passes from the pot is disposed a short distance above the top surface of the bottom wall of the pot. By this construction foreign matter in the lubricant is permitted to settle at the bottom of the pot and does not pass through the vertical conduit.

As many changes could be made in the above construction and many apparently widely different embodiments of the invention might be made without departing from the scope thereof, it is intended that all matter contained in the foregoing description or shown in the accompanying drawings shall be interpreted as illustrative and not in a limiting sense.

Having described the invention what I desire to secure by Letters Patent is:

1. In a spraying apparatus, in combination, a reservoir for a liquid, a chamber, a conduit connecting the former with the latter, a valve in said conduit, a pipe connecting with said chamber whereby air under pressure may be introduced thereto, a supply of air under pressure, a discharge conduit associated with said chamber, and means whereby air from said pipe may be passed through said conduit and discharged downwardly on to the liquid in said reservoir.

2. In a spraying apparatus, in combination, a reservoir for a liquid, a chamber, a conduit connecting the former with the latter, a valve in said conduit, a pipe connecting with said chamber whereby air under pressure may be introduced thereto, a supply of air under pressure, a discharge conduit associated with said chamber, means whereby air from said pipe may be passed through said conduit and discharged downwardly on to the liquid in said reservoir, and means comprising a perforated reservoir cap whereby the air so discharged is directed to exit through an irregular passage.

3. In a spraying apparatus, in combination, a reservoir for a liquid, a chamber, a conduit connecting the former with the latter, a valve in said conduit, a pipe connecting with said chamber whereby air under pressure may be introduced thereto, a supply of air under pressure, a discharge conduit associated with said chamber, means whereby air from said pipe may be discharged downwardly on to the liquid in said reservoir, and means comprising a perforated reservoir cap whereby the air so discharged is directed to exit through an irregular passage; the means for discharging said air downwardly and the means permitting exit of said air being in disalinement to restrict the discharge of the liquid in volume through the air exit.

4. In a spraying apparatus, in combination, a reservoir for a liquid, a chamber, a conduit connecting the former with the latter, a valve in said conduit, a pipe connecting with said chamber whereby air under pressure may be introduced thereto, a supply of air under pressure, a discharge conduit associated with said chamber, and means comprising a perforated reservoir cap whereby air from said supply entering the said reservoir is directed to exit through an irregular passage.

5. In a spraying machine, in combination, a reservoir for a liquid, means for heating the liquid in said reservoir, a chamber having an inlet for liquid from said reservoir and an air inlet, a discharge pipe leading from said chamber, a valve between the reservoir and chamber, a valve in the air inlet, a single operating member for both valves and adjustable means for varying the limit of movement of said operating member to vary the amount of flow of the liquid to said chamber in a given time.

6. In a spraying machine, in combination, a pot, a perforated cover therefor, a vertical conduit extending from the bottom of the pot and having its communication with the contents of the pot through a substantially right angled member with an opening above the inside bottom surface of the pot, a chamber entered by the vertical conduit, a source of supply of air under pressure, a pipe from said air supply entering said chamber at an angle to said conduit, a discharge member for said chamber arranged opposite the entrance of the air supply pipe, two valves, one in the vertical conduit and one in the air supply pipe, an operating member movement of which in one direction opens the valve in the vertical conduit and movement of which in the opposite direction closes the last said valve and opens the valve in the air supply pipe.

7. In a spraying device, in combination, a pot having a relatively small opening at the top thereof, a chamber, a conduit between the pot and the chamber, means for supplying air under pressure to said chamber, a discharge member connected with said chamber whereby liquor from the pot which has entered the chamber may be conducted by the air to the work, and means whereby upon closure of a portion of said discharge member a supply of air may be directed through said conduit to a point of discharge above the liquor in the pot.

8. In a spraying device, in combination, a pot having a relatively small opening at the top thereof, a chamber, a conduit between the pot and the chamber, means for supplying air under pressure in said chamber, a discharge member connected with said chamber whereby liquor from the pot which has entered the chamber may be conducted by the air to the work, and means whereby upon closure of a portion of said discharge member a supply of air may be directed through said conduit to a point of discharge above the liquor in the pot, and thence to the outside of said pot; said means comprising a bent pipe having its discharge orifice directed toward the top surface of the liquid in the pot and a bent pipe extending from the interior of the pot above the liquor to the said small opening at the top.

Signed at Cambridge in the county of Middlesex and State of Massachusetts this fourteenth day of August A. D. 1916.

MICHAEL J. ROCHE.